United States Patent Office 3,326,236
Patented June 20, 1967

3,326,236
MAGNETICALLY DETENTED VALVE AND
METHOD OF ADJUSTMENT
Donald E. Beckett and William N. Beckett, Wilmington, Ohio, assignors to Beckett-Harcum Company, Wilmington, Ohio, a corporation of Ohio
Filed June 24, 1964, Ser. No. 377,701
10 Claims. (Cl. 137—624.14)

The present invention relates to a magnetically detented valve and method of adjustment. Such valves are often used for directing fluid under pressure alternately to opposite end chambers of a reciprocating piston type fluid motor, operation of the valve being normally dependent upon an accumulation of pressure within the valve resulting from stalling of the fluid motor. Other uses for such a valve, include an automatic cut-off of fluid pressure fed to a receptacle or a chamber in which pressure of fluid builds up to a value sufficient to trip the valve, and in such cases the valve may be one of the single-acting type rather than the double-acting reciprocating type valve disclosed herein by way of example. The present invention is applicable to valves of the single-action and the double-action types, as will become manifest in the light of the present disclosure.

An object of the invention is to provide improvements in a magnetically detented air valve, which render the valve reliably responsive to operating pressures built up therein.

Another object of the invention is to provide an improved pressure-responsive magnetically detented valve which is critically adjustable for operation at predetermined or selected internal pressure values.

A further object of importance is to so construct a magnetic valve of the character stated, that the required level of magnetic force needed for ensuring effective operation of the valve, is not prematurely depreciated by extended or hard usage of the valve in service.

Another object of the invention is to provide in a valve of the character stated, improvements which will facilitate and expedite servicing of the valve when necessary, without resort to expensive procedure and parts replacements.

A further object is to provide a valve of the character stated, which is simplified as to manufacture and initial assembly, with resultant substantial savings of production costs.

The foregoing and other objects are attained by the means described herein and illustrated upon the accompanying drawings, in which.

Figure 1:
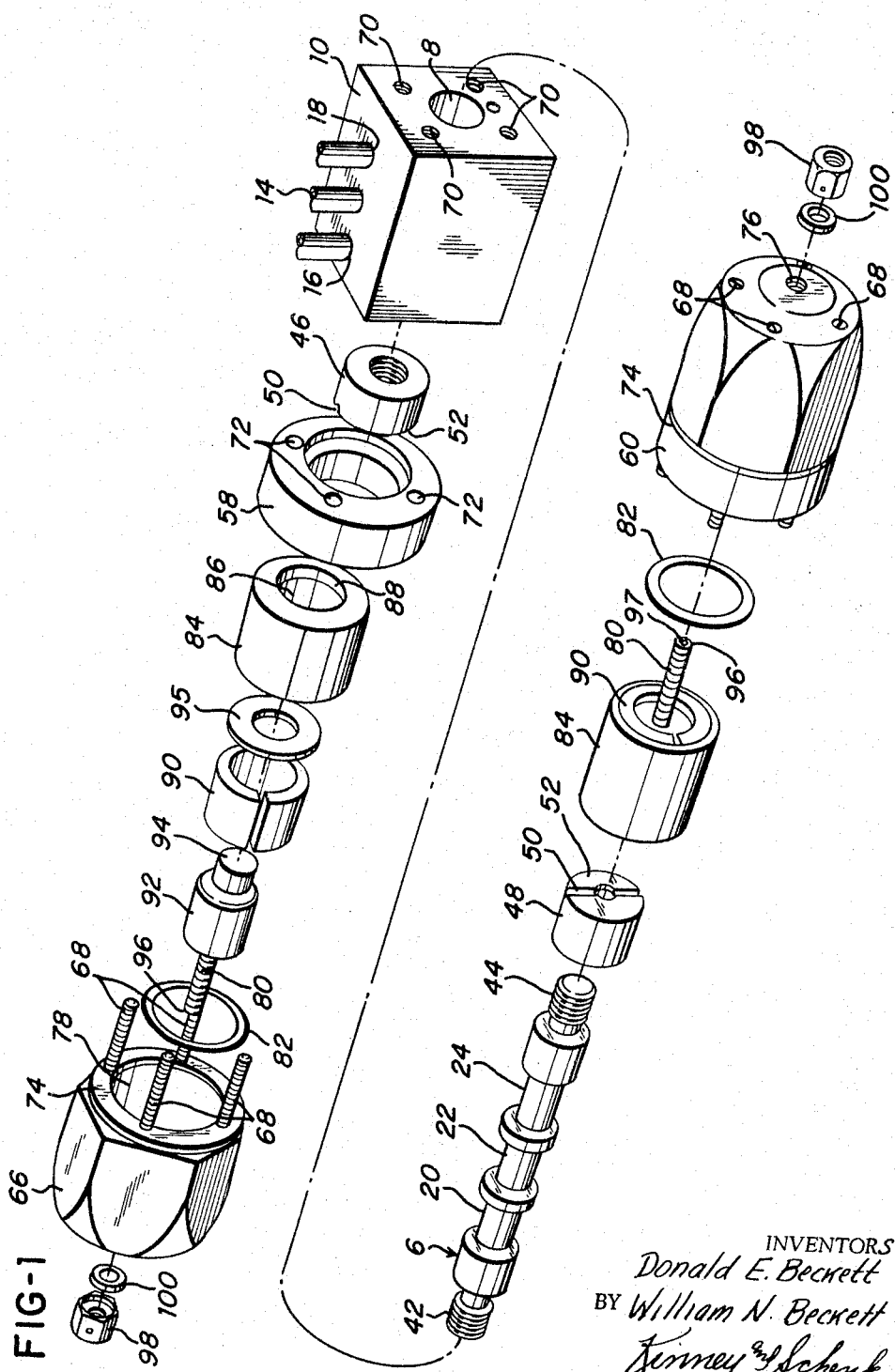
FIG. 1 is an exploded perspective view of a valve embodying the present invention.

Solely by way of example, and not by way of restriction or limitation, we will now describe our invention in association with an internal, self-piloted valve; however, it should be understood that the subject invention may be used with other types of valves, such as, by way of example, externally piloted valves, and the like. The valve illustrated is an internal self-piloted valve of the reciprocative spool type, wherein a spool 6 is longitudinally shiftable within an elongate bore 8 of a valve body 10, to control flow of fluid through various passageways incorporated in the valve body. The valve body may include an inlet port 12 fed by a source 14 of fluid under pressure, and a plurality of fluid exhaust ports indicated at 16 and 18. The spool has several recesses 20, 22, 24 which by reciprocation of the spool, may be registered in different combinations with ports 14, 16, and 18, to feed pressurized fluid to either of two feeder ports 26 and 28, and to exhaust fluid from the feeder ports 26 and 28, and to exhaust fluid from that feeder port which carries displaced fluid from fluid motor 30.

Figure 2:
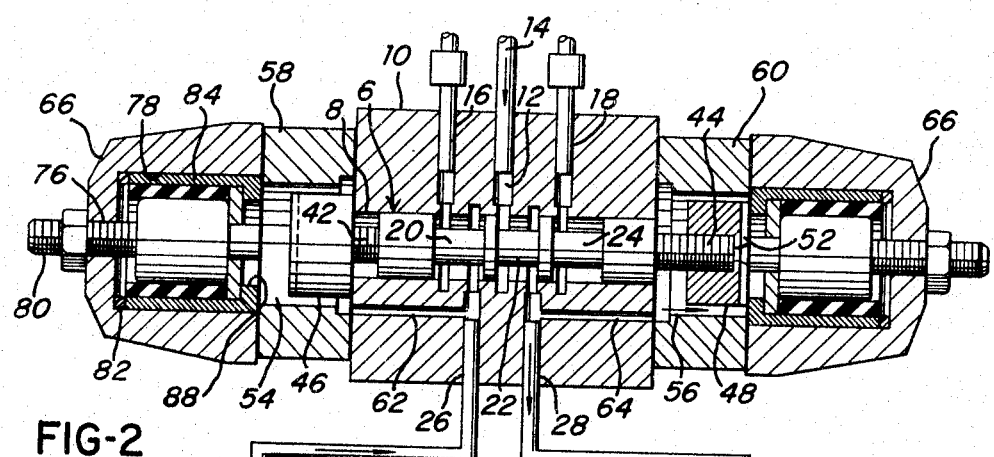
FIG. 2 is a vertical cross-section of the valve in assembled condition, and showing a typical fluid motor operatively associated therewith, the piston of the fluid motor being displaced to the right within its cylinder.

To explain further, FIG. 2 shows the valve spool shifted to the right, for placing recess 22 in position to direct fluid from pressure line 14 into port 28, thereby to pressurize feeder pipe 32 for moving piston assembly 34–36 to the left within cylinder 38. Displacement fluid from the cylinder leaves through feeder pipe 40, port 26, recess 20, and exhaust port 16. The piston assembly includes piston rod 36.

Figure 3:
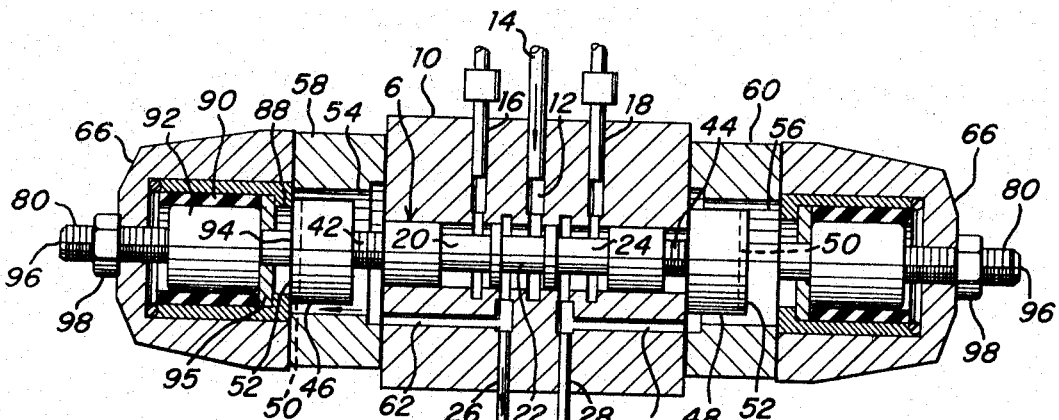
FIG. 3 is a view similar to FIG. 2, showing the relationship of parts prevailing when the fluid motor piston is displaced to the left within its cylinder.

Referring now to FIG. 3, shifting of valve spool 6 to the left places recess 22 in position to direct fluid from pressure line 14 into port 26, thereby to pressurize feeder pipe 40 for moving piston assembly 34–36 to the right within cylinder 38. Displaced fluid then passes from the right end of cylinder 38, through pipe 32, port 28, recess 24, and exhausts through port 18.

It is evident from the foregoing explanation, that reciprocation of the valve spool may induce reciprocation of the fluid motor piston assembly, and that the direction of motor thrust is dependent upon the direction in which the valve spool is shifted. Thus, if the valve spool is shifted alternately to its two limits of travel, the motor piston assembly will move alternately in opposite directions.

Since it is common practice in some instances to anchor the piston rod 36 and permit the cylinder 38 to do the reciprocating, such variation is to be considered with the scope of the present disclosure. In such cases, the feed pipes 32 and 40 are usually made flexible in character.

As was previously mentioned herein, the valve depends for its operation upon magnetic force. Accordingly, opposite end portions 42 and 44 of valve spool 6, have affixed thereto the ferrous metal armatures 46 and 48. To provide for initial positioning of the armature upon the spool ends, the ends may be externally threaded and the armatures may be in the form of nuts to be threaded onto the armature ends. After determining the proper positioning of the armatures upon the spool ends, the armatures may be locked in place thereon using any appropriate means for the purpose. In any event, the armatures to all intents and purposes are fixed upon the valve spool ends. The armatures may be provided with relief passages 50 in their outer end faces 52, for a purpose to be explained.

The armatures 46 and 48 are adapted to move longitudinally within oversize chambers 54 and 56, respectively, which chambers are, in effect, portions of the valve body notwithstanding the fact that the chambers are shown as occurring in cylindrical spacer blocks 58 and 60, which are extension parts separate from the valve body but fixed endwise thereon. The chambered spacer blocks might as well be integral with the valve body so far as operativeness of the valve is concerned, although in the interest of ease of assembly the separate spacer blocks are preferred.

As shown upon FIGS. 2 and 3, the chambers 54 and 56 have fluid communication with feeder ports 26 and 28, respectively, by way of ducts 62 and 64, so that pressurizing of either feeder port for moving the piston 34, will result in pressurizing its associated armature chamber 54 or 56. Otherwise stated, the amount of pressure imposed upon the piston within cylinder 38, will be present also within its associated armature chamber 54 or 56, by reason of the connections established through ducts 62 and 64. It is therefore apparent that pressure build-up occurring within cylinder 38 by reason of the piston reaching its limit of travel within the cylinder, will be transferred to one of the armature chambers so as to act upon the end face of an armature for shifting the valve spool. This action will occur as the result of imposing any sufficient opposition to fluid pressure advancement of the piston or its rod 36.

Magnetic means may be provided at one or both ends of the valve, for releasably holding the valve spool in a shifted position. In the example illustrated by the drawings, such magnetic means are shown at both ends of the valve, operative upon the armatures 46 and 48. Since the magnetic means at one end of the valve is identical to that at the opposite end thereof, a description of one should suffice for the other also.

The magnetic means may be assembled in a valve end cap 66 formed of non-magnetic material, and adapted to be secured endwise upon the valve body by means of screws 68 threaded into openings 70 of the valve body. The same screws 68 may pass through unthreaded openings 72 of the spacer block 58, for fixing the block upon the valve body, preferably with a gasket interposed to avoid fluid leakage. A gasket 74 may be interposed also between the cap and the spacer block, for the same purpose.

The end cap is provided with an axial bore 76 and an enlarged concentric counterbore 78, which bores are in alignment with the axis of spool 6. Bore 76 extends through the outer end of cap 66, and is preferably screw-threaded to threadedly engage an adjusting screw 80. The counterbore 78 may be a smooth cylindrical bore, opening to the inner end of cap 66. Counterbore 78 is preferably slightly greater in diameter than the diameter of armature chamber 54, and may be concentric therewith. The bottom of counterbore 78 may support a gasket ring 82.

Counterbore 78 is snugly receptive of a magnet cup 84 of mild steel or other suitable ferrous metal. Said cup may be sleevelike in form, presenting an axially disposed chamber 86 which is open at opposite ends thereof. An inwardly directed annular flange 88 may partially constrict that open end of the cup or sleeve which is exposed to armature 46, or in other words, that open end of the cup or sleeve which coincides with the open end of cap bore 78.

The chamber 86 of magnet cup 84 is lined with a magnetic strip or liner 90 of flexible material, of which "Plastiform" is an example, this being the trademark of a rubber bonded barium ferrite consisting of magnetized particles arranged or in a rubber-like strip of sheet material in such manner that opposite faces of the strip are of opposite magnetic polarity. The strip is cut to proper length, and placed as a liner within the cup to polarize the cup.

There reference numeral 92 indicates a central pole piece formed as a ferrous metal cylindrical body dimensioned to enter the magnetic liner and press it snugly against the inner surface of cup 84. The adjusting screw 80 is anchored in pole piece 92 axially thereof at one end, and the opposite end of the pole piece may be reduced in diameter to extend through the flanged end of magnet cup 84. The projecting free end 94 of pole piece 92 is planar, to present to armature 46 a face which is normal to the axis of the pole piece and parallel to the outer planar face 52 of the armature. By manipulating the adjpusting screw 80, the free end 94 of the pole piece may be located at preselected distances from the outer planar face 52 of armature 46. The character 95 indicates a perforated washer or insulator of non-magnetic material loosely surrounding pole piece end 94 and abutting the flange 88.

Manipulation of adjusting screw 80 may be facilitated by providing its external end 96 with a wrench-receptive socket 97, or a screw-driver slot, whereby the screw may be adjustably rotated. A lock nut 98 backed up by a gasket ring 100, may be employed to fix the screw in adjusted positions.

From the foregoing explanation, it will be understood that rotation of the adjusting screw 80 of FIG. 3, will serve to bodily shift the part 92–94 axially so as to increase or decrease the gap between pole end 94 and the adjacent face 52 of armature 46, thereby to regulate the force of magnetism which attracts the armature to pole elements 94 and 88. Increasing the gap between surfaces 94 and 52 weakens the holding power of the magnetic means, so that a reduced pressure of fluid within chamber 54 will suffice to break the hold and drive the armature 46 and spool 6 to the right. If the adjusting screw is manipulated to reduce or eliminate the gap between parts 94 and 52, fluid pressure of a much greater value will be required for shifting the armature 46 and valve spool 6.

In actual practice, valves constructed substantially as herein disclosed, respond to adjustments of screws 80 allowing the spool to shift at pressures of fluid ranging between 5 and 100 p.s.i. The relief passage 50 in the face 52 of the armature, permits fluid under pressure to act upon the full area of spool 6, for shifting the armature.

It is important to note that sudden or forceful repetitious shifting of the spool assembly imposes no pounding shock upon the permanently magnetized strip 90, to destroy or depreciate the force of magnetism of the strip. This advantage is gained whether or not the armature 46 physically strikes the parts 88 or 94 while shifting. In practice, the striking force of armature 46 upon parts 88 or 94, may be obviated or regulated, by so positioning the other armature 48 upon spool end 44, that armature 48 will strike the valve body 10 in advance of, or concurrently with, contact of armature 46 with flange 88 or pole piece 94. In any event, permanency of the magnetic force of strip 90 will not be impaired by any pounding effect that may result from forceful and sudden reciprocation of the spool and its associated armatures.

In operation, a sustained pressure of fluid is maintained at inlet port 12. If the valve is conditioned according to FIG. 2, fluid will enter recess 22 and pass to feeder port 28 and feed line 32, for moving the piston of motor 30 to the left. At the same time, duct 64 shunts a portion of the fluid under pressure to armature chamber 56.

When piston 34 reaches the left-hand limit of cylinder 38, pressure of fluid will accumulate in the cylinder and within armature chamber 56, until the pressure reaches a value sufficient to overcome the magnetic holding power of the magnetic means at the right end of the valve, to unseat the armature 48 and send it leftwardly toward the valve body, thereby to shift the valve spool to FIG. 3 position. In the new position of FIG. 3, armature 46 is held by the magnetic force of pole elements 94 and 88.

With the valve spool shifted to FIG. 3 position, fluid under pressure will enter recess 22 and pass to feeder port 26 and feed line 40, for moving the piston 34 to the right. At the same time, duct 62 shunts a portion of the fluid under pressure to armature chamber 54. When piston 34 reaches the right-hand limit of cylinder 38, pressure of fluid will accumulate in the cylinder and within chamber 54, until the pressure reaches a value sufficient to overcome the magnetic holding power of the magnetic means at the left end of the valve, to unseat the armature 46 and send it to the right, thereby to shift the valve spool back to FIG. 2 position.

Repetition of the aforesaid piston and valve spool movements will continue as long as pressure of fluid is maintained at inlet port 12. In some applications, stops may be applied to piston rod 36 for establishing limits of piston travel short of the full length of cylinder 38. However the limits are established, stalling of the piston movements in opposite directions will effect operation of the valve. As was previously explained, pressurizing of the motor cylinder at one side of the piston is accompanied by an exhaust of fluid from the cylinder at the opposite side of the piston, through the exhaust ports 16 and 18 of the valve.

In a single-action pressure cut-off valve arrangement, the magnetic means and pressure chamber at one end of the valve may be omitted, so that the valve spool shifts automatically in one direction only.

It is to be understood that various modifications and changes may be made in the structural details of the device, within the scope of the appended claims, without departing from the spirit of the invention.

What is claimed is:

1. A pressure responsive valve comprising in combination: a body having a main bore, an armature chamber, a fluid pressure inlet port, and a fluid feeder port; a shiftable valve member with the main bore and including means to register the inlet port with the feeder port upon shifting of the valve member to an operative position, and to de-register said ports upon shifting of the valve member to an inoperative position; an armature of magnetic material shiftable within the armature chamber and movable with the valve member, said armature being responsive to elevated pressure of fluid within the chamber, to shift the valve member to inoperative position; means shunting fluid from the feeder port to the armature chamber, for actuating the armature to shift the valve member to inoperative position incident to an excess of fluid pressure occurring within the feeder port; an end cap for the valve body to close an end of the armature chamber, said end cap having a bore exposed in axial alignment with said chamber, a hollow magnet cup within the cap bore and having an open end exposed to the armature, said cup end being in a plane parallel to the armature for contact therewith, a permanently magnetized liner within the cup, said liner having an interior surface and an exterior surface of opposite magnetic polarities, the cup being of a material polarizable by the exterior surface of the liner contained therein, a central pole piece embraced by the interior surface of the liner, said pole piece having an extending end and being of a material polarizable by the interior surface of the liner, the pole piece end and the open end of the magnet cup being exposed to the armature for magnetically releasably restraining the armature against movement of the valve member to inoperative position, and means for bodily adjusting the central pole piece independently of the magnet cup, toward and from the aforesaid plane of the open end of the magnet cup.

2. The valve as set forth in claim 1, wherein the permanently magnetized liner is in the form of a flexible resilient strip curled to line the interior of the hollow magnet cup.

3. A magnetic valve comprising in combination: a body having a main elongate bore, and an armature chamber in substantial alignment with said bore; a valve spool shiftable lengthwise within said bore between two limits, said spool having an end projecting toward the armature chamber; an armature having a forward face, and means fixing the armature upon the spool end, with said forward face disposed within the armature chamber and in substantial perpendicularity to the axis of the main bore; an end cap closing an end of the armature chamber, said end cap having a bore exposed in axial alignment with said chamber, a cylinder of permanently magnetized material located axially within the end cap bore, said cylinder having interior and exterior wall surfaces of opposite magnetic polarities, a substantially cylindrical sleeve member disposed within the end cap bore and surrounding the exterior wall surface of the magnetized cylinder; a substantially cylindrical central pole piece within the magnetized cylinder and contacting the interior wall surface thereof, said pole piece and said sleeve member having corresponding ends, and each being of a material polarizable by a wall surface of the magnetized cylinder, the corresponding ends of the sleeve member and the pole piece being in the path of advancement of the forward face of the armature, with the end of the sleeve member within striking range of said armature face, and adjustable means for selectively moving the pole piece axially relative to the sleeve member, from a position within striking range of the shiftable armature, to various positions beyond the striking range of the armature.

4. The device as set forth in claim 3, wherein the magnetized cylinder is flexible in character; and occupies a position within the end cap bore always out of striking range of the shiftable armature.

5. The method of regulating the holding power of a magnetic cylinder having interior and exterior wall surfaces of opposite magnetic polarities, said method comprising: surrounding the exterior wall surface with a polarizable member; lining the interior wall surface of said cylinder with a second polarizable member; exposing corresponding ends of said members, exclusive of the magnetic cylinder, to impact of an armature which is magnetically attracted to said polarizable members; and moving one of said members relative to the other for establishing a variable gap between the armature and the end of the movable one of said member.

6. The method as set forth in claim 5, wherein the magnetic cylinder is formed of a permanently magnetized strip of flexible material.

7. A pressure responsive valve comprising in combination: a body having a main bore, an armature chamber, a fluid pressure inlet port, and a fluid feeder port; a shiftable valve member within the main bore and including means to register the inlet port with the feeder port upon shifting of the valve member to an operative position, and to de-register said ports upon shifting of the valve member to an inoperative position; an armature of magnetic material shiftable within the armature chamber and movable with the valve member; a stop in said chamber, magnetic means operative upon the armature to releasably hold the armature against said stop when the valve member is in said operative position, said armature being responsive to elevated pressure of fluid within the chamber, to shift the valve member to inoperative position in opposition to the holding force of the magnetic means; and means shunting fluid from the feeder port to the armature chamber, for actuating the armature to so shift the valve member to inoperative position incident to an excess of fluid pressure occurring within the feeder port, said magnetic means including a permanent magnet, and means for adjusting the holding force of the magnet upon the armature, said last named means including an axially aligned pole piece and armature, with means for axially moving said pole piece to adjusted position to vary the extent of gap between the free end of the pole piece and the adjacent face of the armature.

8. A pressure responsive valve comprising in combination: a body having a main bore, an armature chamber, a fluid pressure inlet port, and a fluid feeder port; a shiftable valve member within the main bore and including means to register the inlet port with the feeder port upon shifting of the valve member to an operative position, and to de-register said ports upon shifting of the valve member to an inoperative position; an armature of magnetic material shiftable within the armature chamber and movable with the valve member, said armature being responsive to elevated pressure of fluid within the chamber, to shift the valve member to inoperative position; means shunting fluid from the feeder port to the armature chamber, for actuating the armature to shift the valve member to inoperative position incident to an excess of fluid pressure occurring within the feeder port; an end cap for the valve body, closing an end of the armature chamber and having a bore exposed in axial alignment with said chamber, a hollow magnet cup within the cap bore and having an end open to the armature chamber, a permanently magnetized liner within the cup, said liner having an interior surface and an exterior surface of opposite magnetic polarities, the cup being of a material polarizable by the exterior surface of the liner contained therein, a central pole piece embraced by and contacting the interior surface of the liner, said pole piece being of a material polarizable by the interior surface of the liner, the pole piece and the magnet cup end being exposed to the armature, for magnetically releasably restraining the armature against movement of the valve member to inoperative position, the combination including means for bodily adjusting the central pole piece relative to the cup toward and from the armature, to produce a gap, variable in size therebetween.

9. A pressure responsive valve comprising in combination: a body having a main bore, an armature chamber, a fluid pressure inlet port, and a fluid feeder port; a shiftable valve member within the main bore and including means to register the inlet port with the feeder port upon shifting of the valve member to an operative position, and to de-register said ports upon shifting of the valve member to an inoperative position; an armature of magnetic material shiftable within the armature chamber and movable with the valve member, said armature being responsive to elevated pressure of fluid within the chamber, to shift the valve member to inoperative position; means for intermittently delivering fluid at elevated pressure to the chamber, for actuating the armature to shift the valve member to inoperative position; an end cap for the valve body to close an end of the armature chamber, said end cap having a bore exposed in axial alignment with said chamber, a hollow magnet cup within the cap bore and having an open end exposed to contact by the armature, a permanently magnetized liner within the cup, said liner having an interior surface and an exterior surface of opposite magnetic polarities, the cup being of a material polarizable by the exterior surface of the liner contained therein, a central pole piece embraced by the interior surface of the liner, said pole piece having an extending end and being of a material polarizable by the interior surface of the liner, the pole piece end and the open end of the magnet cup being exposed to magnetically attract the armature, and the permanently magnetized liner being spaced from the open end of the magnet cup beyond reach of the armature when shifted, the combination including adjustable means for varying the power of magnetic attraction operative upon the armature in one position of shiftability of the latter, said last named means including means for moving said pole piece relative to the cup to produce a gap, variable in size between the free end of the pole piece and the adjacent face of the armature.

10. A magnetic valve comprising in combination: a body having a main elongate bore, and an armature chamber in substantial alignment with said bore; a valve spool shiftable lengthwise within said bore between two limits, said spool having an end projecting toward the armature chamber; an armature having a forward face, and means fixing the armature upon the spool end, with said forward face disposed within the armature chamber and in substantial perpendicularity to the axis of the main bore; an end cap closing an end of the armature chamber, said end cap having a bore exposed in axial alignment with said chamber, a cylinder of permanently magnetized material located axially within the end cap bore, said cylinder having interior and exterior wall surfaces of opposite magnetic polarities, a substantially cylindrical sleeve member disposed within the end cap bore and surrounding the exterior wall surface of the magnetized cylinder; a substantially cylindrical central pole piece within the magnetized cylinder adjacent the interior wall surface thereof, said pole piece and said sleeve member having corresponding ends, and each being of a material polarizable by a wall surface of the magnetized cylinder, the corresponding ends of the sleeve member and the pole piece being in the path of advancement of, and within striking range of, the forward face of the armature, the magnetized cylinder being protected by the sleeve member, against advancement impact of the armature, and adjustable means selectively moving the pole piece axially relative to the sleeve member from a position within striking range of the shiftable armature, to various positions beyond the striking range of the armature.

References Cited
UNITED STATES PATENTS

| | | | |
|---|---|---|---|
| 252,497 | 1/1882 | Mott | 317—176 |
| 2,708,944 | 5/1955 | Modine | 251—65 X |
| 2,836,194 | 5/1958 | Tjadenq | 251—65 X |
| 3,121,131 | 2/1964 | Blume | 317—201 |
| 3,181,559 | 5/1965 | Hipple et al. | 137—489 |
| 3,203,439 | 8/1965 | Beckett | 251—65 X |

M. CARY NELSON, *Primary Examiner.*

ARNOLD ROSENTHAL, *Examiner.*